United States Patent
Mayer (10) Patent No.: US 10,540,124 B2
(45) Date of Patent: Jan. 21, 2020

(54) FAST PAGE FIRST PRINT OPTIMIZATION

(71) Applicant: Hewlett-Packard Development Company, L.P., Houston, TX (US)

(72) Inventor: Brian C Mayer, Boise, ID (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/097,375

(22) PCT Filed: Jul. 15, 2016

(86) PCT No.: PCT/US2016/042575
§ 371 (c)(1),
(2) Date: Oct. 29, 2018

(87) PCT Pub. No.: WO2018/013138
PCT Pub. Date: Jan. 18, 2018

(65) Prior Publication Data
US 2019/0146729 A1    May 16, 2019

(51) Int. Cl.
*G06F 15/00* (2006.01)
*G06F 3/12* (2006.01)
*G06K 1/00* (2006.01)

(52) U.S. Cl.
CPC .......... *G06F 3/1214* (2013.01); *G06F 3/1248* (2013.01); *G06F 3/1276* (2013.01); *G06F 3/1285* (2013.01)

(58) Field of Classification Search
CPC .... G06F 3/1214; G06F 3/1248; G06F 3/1276; G06F 3/1285
USPC .............................. 358/1.15, 1.13, 1.14, 1.1
See application file for complete search history.

(56) References Cited

U.S. PATENT DOCUMENTS

| | | |
|---|---|---|
| 7,173,719 B2 | 2/2007 | Bearss et al. |
| 7,948,651 B2 | 5/2011 | Truong et al. |
| 2004/0012787 A1 | 1/2004 | Letellier |
| 2007/0053001 A1 | 3/2007 | Huntley et al. |
| 2009/0086265 A1 | 4/2009 | Toda et al. |
| 2010/0202008 A1 | 8/2010 | Aronshtam et al. |
| 2011/0080614 A1 | 4/2011 | Sasaki |
| 2012/0147387 A1 | 6/2012 | Morrison et al. |
| 2012/0236357 A1 | 9/2012 | Cech et al. |

(Continued)

OTHER PUBLICATIONS

Digital Production System Xerox Nuvera 100/120/144 System Release 7.0 with FreeFlow DocuSP® 5.1Customer Expectatiions Document , Oct. 27, 2006—50 pages.

*Primary Examiner* — Douglas Q Tran
(74) *Attorney, Agent, or Firm* — Brooks Cameron & Huebsch PLLC (57) ABSTRACT

Example implementations relate to fast page first print optimization. For example, a system according to the present disclosure, may include a host driver coupled to a printing device. The host driver may send a command to the printing device indicating implementation of a fast page first feature, implement a page description language (PDL) on the printing device that defines print parameters for a print job on a first command of each page of the print job. Moreover, in response to the definition of the print parameters, and during or prior to startup of a print engine on the printing device, the host driver may determine if a print optimization of the fast page first feature would reduce a first page out time (FPOT) of the print job.

15 Claims, 4 Drawing Sheets

(56) References Cited

U.S. PATENT DOCUMENTS

| | | | |
|---|---|---|---|
| 2014/0029047 A1* | 1/2014 | Giannetti | G06F 3/1212 |
| | | | 358/1.15 |
| 2014/0160526 A1 | 6/2014 | Shinagawa | |
| 2014/0268216 A1* | 9/2014 | Soriano | G06K 15/1803 |
| | | | 358/1.15 |
| 2015/0356385 A1 | 12/2015 | Naka | |
| 2016/0283171 A1* | 9/2016 | Tokumoto | G06F 3/1207 |

* cited by examiner

FAST PAGE FIRST PRINT OPTIMIZATION

BACKGROUND

In a laser printer, a laser may scan an image onto a charged drum, which is then coated with toner where the laser printer scanned the image. The image may be developed with the toner, and may be transferred to the media. Various speed ratings may be associated with laser printers including a first-page out time (FPOT). The FPOT indicates how long it takes for a printer to complete and eject the first printed page of a print job once the user starts the print job.

DETAILED DESCRIPTION

Various speed ratings may be associated with laser printers. For instance, a number of pages per minute (PPM) rating indicates the number of pages the printer can print once it has warmed up. The PPM rating generally depends on the speed with which a printer can decode a provided print job for printing, as well as the speed at which the various components within the printer can operate. Another speed rating is the FPOT. The FPOT rating indicates how long it takes for a printer to complete and eject the first printed page of a print job once the user has initiated the print job.

The FPOT for a laser printer may depend on a variety of factors. For instance, the FPOT may depend on the length of time it takes to heat the fuser so that it can fuse printing toner to media. If the fuser is not warm enough, then the toner may not properly adhere to the media. As such, the toner may easily rub or flake off the media, or print quality may decrease. The FPOT for a laser printer may also depend on timing of commands between various components within the printing device. As used herein, "components" of a printing device refer to individual hardware devices and/or software which collectively comprise the functional printing device. Examples of components of a printing device may include a scanner, a fuser bar, a high voltage drum, and a paper delivery system, among other components.

Page Description Languages such as printer control language (PCL) may allow for the redefinition of various parameters of a print job. For example, the size, type, source and/or destination of the print job may be redefined during processing of print jobs, such as until the last command for the print job is received. Such timing may reduce time efficiency of the printing device by removing parallelization, as some components of the printing device, e.g., components involved in later relative stages of the printing process, must wait to perform operations until other components, e.g., components involved in earlier relative stages of the printing process, are done.

Fast page first print optimization, in accordance with the present disclosure, may reduce the FPOT of a print job by increasing overlap of timing between various print components. By providing various parameters and timing values related to processing of the print job at the beginning of processing of the print job, later components may proceed with warm up processes while the language parsing component finishes parsing the page, and thereby reduce the FPOT.

Figure 1:
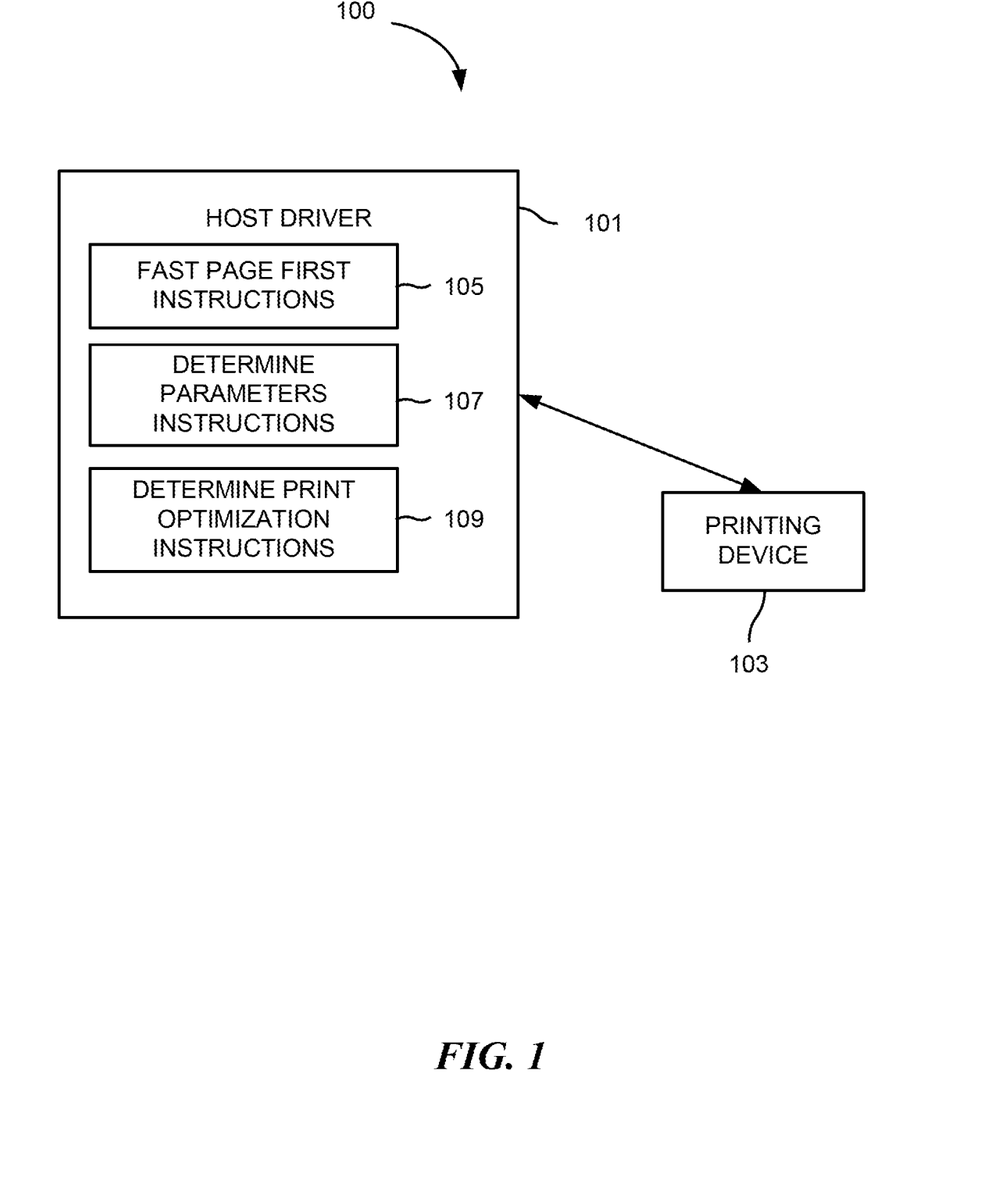
FIG. 1 illustrates a diagram of a system for fast page first print optimization, according to the present disclosure.

FIG. 1 illustrates a diagram of a system 100 for fast page first print optimization, according to the present disclosure. As illustrated in FIG. 1, the system 100 may include a host driver 101 coupled to a printing device 103. As used herein, a "host driver" refers to hardware and/or instructions on a host computing device which is coupled to a network. The printing device 103, among other devices, may be coupled to the host driver 101. The host driver 101 may provide various instructions to printing device 103 relating to fast page first print optimization. In a host-based system as illustrated in FIG. 1, the host driver 101 may analyze print jobs for complexity, and send various metadata to the printing device 103, such that a formatter on the printing device 103 (formatter not illustrated in FIG. 1) may implement optimization within various components of the printing device 103. Furthermore, while a host driver 101 is described herein as communicating with the printing device 103, it is noted that any computing device coupled to printing device 103 may analyze a print job for fast page first print optimization, according to the present disclosure, and communicate various instructions and/or metadata to the printing device 103 for optimization. For example, instructions executed by the host driver 101 may also be executed by a formatter, such as a formatter on printing device 103.

The host driver 101 may provide fast page first instructions 105 to printing device 103. That is, the host driver 101 may send a command to the printing device 103 indicating implementation of a fast page first feature. For instance, the host driver 101 may instruct the printing device 103 that particular print optimization processes are to be executed. As used herein, a "fast page first" feature refers to a printing process which, when executed by the printing device 103, reduces a FPOT of a print job by implementing the processes described herein. In some examples, the host driver 101 may indicate implementation of the fast page first feature by including a particular flag in the instructions that is associated with the fast page first feature. In some examples, all print jobs may have an indication of implementation of the fast page first feature, such that if the executing printing device (e.g., 103) supports fast page first printing, the fast page first feature is implemented by default.

The host driver 101 may also implement a page description language (PDL) on the printing device 103 that defines print parameters for a print job on a first command of each page of the print job. As used herein, a "page description language" refers to a computer language that describes the layout and contents of a printed page. For instance, instead of waiting until the last command of a page of the print job, various print parameters may be defined in a first command of the print job. Examples of the print parameters may include a page size, a page type, a source location, and a destination location, among other examples. That is, by implementing the PDL on the printing device 103, the page size, type, source, and destination may be defined in a first command of a print job, rather than the last. By implementing the PDL in the first command, the host driver 101 may indicate or guarantee to the printing device 103, that the parameters will not be redefined later in the print job.

In some examples, the definition of the print parameters may be defined in a print engine command (PEC). For instance, the print parameters may be defined in an PEC_Reserve command. The PEC_Reserve command may be issued by the printing device 103 in response to a PEC, such as a PEC_EarlyStart command. The PEC_Reserve command may also be referred to as a page reservation command, as described herein. The PEC_EarlyStart command may be issued by the printing device 103 to an engine within the printing device 103, instructing the engine to start various start-up processes. For instance, the PEC_EarlyStart command may instruct the engine to start a start-up sequence on a scanner bar, and start a fuser warmup sequence on a fuser temperature bar. The PEC_Reserve command may tell the print engine the size of the media, the type of media to be printed on, the source that it is coming from, the destination it is going to, and the color mode of the print job.

Issuance of the PEC_Reserve command by the printing device 103 may result in a cascade of additional commands issued by the printing device 103. That is, once the PEC_Reserve command is issued by the print engine, e.g., the print parameters are defined, additional commands may be issued to continue processing the print job. For example, PEC_StartEstimate commands may be issued by the print engine that provide an estimate as to how long the formatter will take to actually render the page to be printed, such that a start print command, PEC_Start, may be issued. The PEC_Start command may issue a StartVideo (SV) command, and the SV command may result in the transmission of the rendered image from the formatter to the pring engine.

In response to the definition of the print parameters, and during or prior to startup of a print engine on the printing device, the host driver 101 may determine if a print optimization of the fast page first feature would reduce a FPOT of the print job. To determine if the print optimization would reduce the FPOT of the print job, the host driver may analyze a PDL for the print job, and determine a complexity of the print job based on the PDL. The host driver may then determine an estimated completion time of a PDL parser in the print device 103, based on the determined complexity of the print job. The complexity of the print job may be determined based on a number of factors. For instance, the complexity of the print job may be based on an amount of material to be printed, a color mode of the material to be printed, among other factors. As described herein, the analysis of the complexity of the print job may be performed during or prior to startup of the print engine on the printing device.

Furthermore, in some examples, the host driver 101 may analyze a different type of print language to determine the complexity of the print job. For instance, the host driver 101 may analyze an intermediate spooler language, among others, to determine the complexity of the print job. In yet other examples, the host driver 101 may ask the printing device 103 if the device supports the fast page first feature using a simple network management protocol (SNMP) or other means, and decide to mark the print job as a fast page first print job with appropriate command ordering.

As described herein, the host driver 101 may instruct the printing device 103 to issue a page reservation command, such as the PEC_Reserve command, upon receipt of the print parameters. In response to issuance of the page reservation command, the host driver 101 may issue a default PDL parsing completion time while the PDL is still processing, to a print engine on the printing device 103. For instance, the host driver 101 may instruct the printing device 103 to issue an PEC_StartEstimate command with a default PDL parsing completion time, indicating when the printing engine should start.

As such, the system 100 may be configured such that the host driver 101 may instruct the printing device 103 to begin a print engine start up process before completion of parsing of the print job, based on an estimated completion time of PDL parsing, e.g., based on the PEC_StartEstimate commands. In such a manner, the print engine may begin start-up processes, and if the host driver 101 determines that the fast page first feature would reduce the FPOT of the print job, the host driver 101 may instruct the printing device 103 to communicate an earlier completion time of PDL parsing to the print engine, such that printing will begin earlier than the estimated time.

Figure 2:
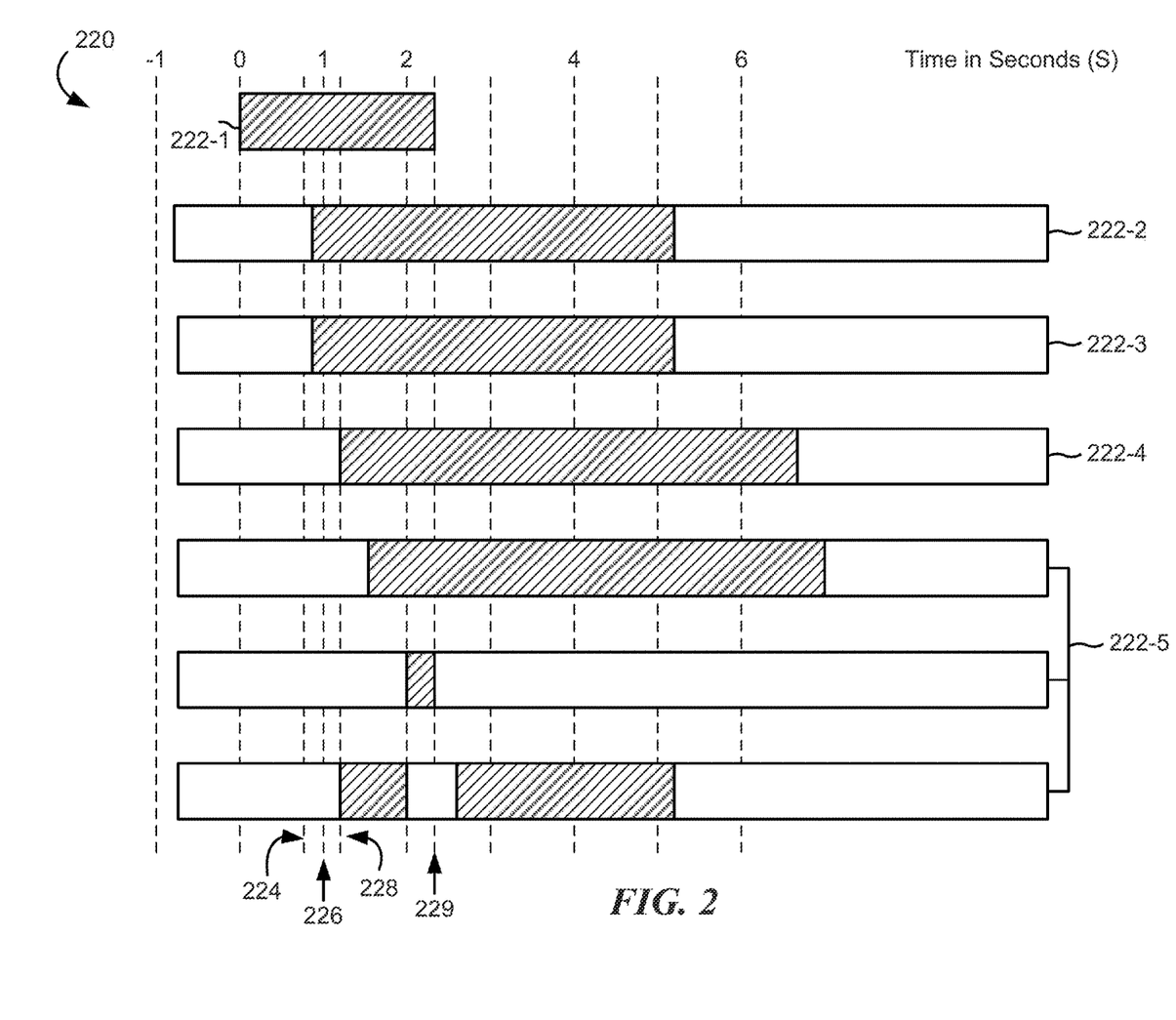
FIG. 2 is a diagram illustrating an example timing scheme of various printing operations, in accordance with the present disclosure.

FIG. 2 is a diagram illustrating an example timing scheme 220 of various printing operations, in accordance with the present disclosure. As discussed in relation to FIG. 1, the timing of various processes, and issuance of various commands, may impact FPOT of the print job. For instance, referring to FIG. 1, the timing of printing operations 222-1, 222-2, 222-3, 222-4, and 222-5 (collectively referred to herein as printing operations 222), among others, may be coordinated. Although not indicated on FIG. 2, operation 222-1 may correspond to sending and/or receipt of instructions to and/or from the host, such as host driver 101 illustrated in FIG. 1. The shaded portion of block 222-1 illustrates the times during which operations are performed by the host and/or communications are received from the host. Operation 222-2 may correspond to performance of operations on a laser scanner. White space within block 222-2 may illustrate times during which the laser scanner is not performing actions, whereas patterned space within block 222-2 may illustrate times during which the laser scanner is performing printing operations, such as performing a start-up sequence or actively scanning. Operation 222-3 may correspond to performance of operations on a fuser. White space within block 222-3 may illustrate times during which the fuser bar is not performing actions, whereas patterned space within block 222-3 may illustrate times during which the fuser is performing printing operations, such as performing a fuser warm-up process and/or maintaining a printing temperature. Operation 222-4 may correspond to performance of operations on a high voltage drum. White space within block 222-4 may illustrate times during which the high voltage drum is not performing actions, whereas patterned space within block 222-3 may illustrate times during which the high voltage drum is performing printing operations, such as a pre-rotation process, a regular rotation process, and/or a post-rotation process. Operations 222-5 may collectively correspond to performance of various media delivery operations, such as SV initiation, paper detection, alienation, and paper delivery, among others. White spaces within operations 222-5 may illustrate times during which operations are not being performed, whereas patterned space within operations 222-5 may illustrate times during which media delivery operations are performed, such as contact preparation, print contact, alienation preparation, paper detection, and paper delivery, among others.

As illustrated in FIG. 2, the timing of various operations may be affected by the issuance of various commands, 224, 226, 228, and 229. For example, at 224, the PEC_EarlyStart command may be issued, which may initiate start-up processes in the laser scanner (e.g., as illustrated at 222-2), and start-up processes in the fuser (e.g., as illustrated at 222-3). Similarly, the PEC_Reserve command may be issued at 226, followed shortly by the PEC_StartEstimate commands at 228. In response to the issuance of the PEC_StartEstimate commands, the high voltage drum (e.g., as illustrated at 222-4) may initiate processes, and the media delivery operations (e.g., as illustrated at 222-5) may initiate various processes. Moreover, at 229, the PEC_Start command may be issued, which may initiate SV, resulting in rendering of the printed image. As described in relation to FIG. 1, the PEC_Reserve command (e.g., 226) may be issued upon receipt of the first command of a print job, rather than the last command of the print job, thereby resulting in an earlier issuance of the PEC_Start command (e.g., 229).

Figure 3:
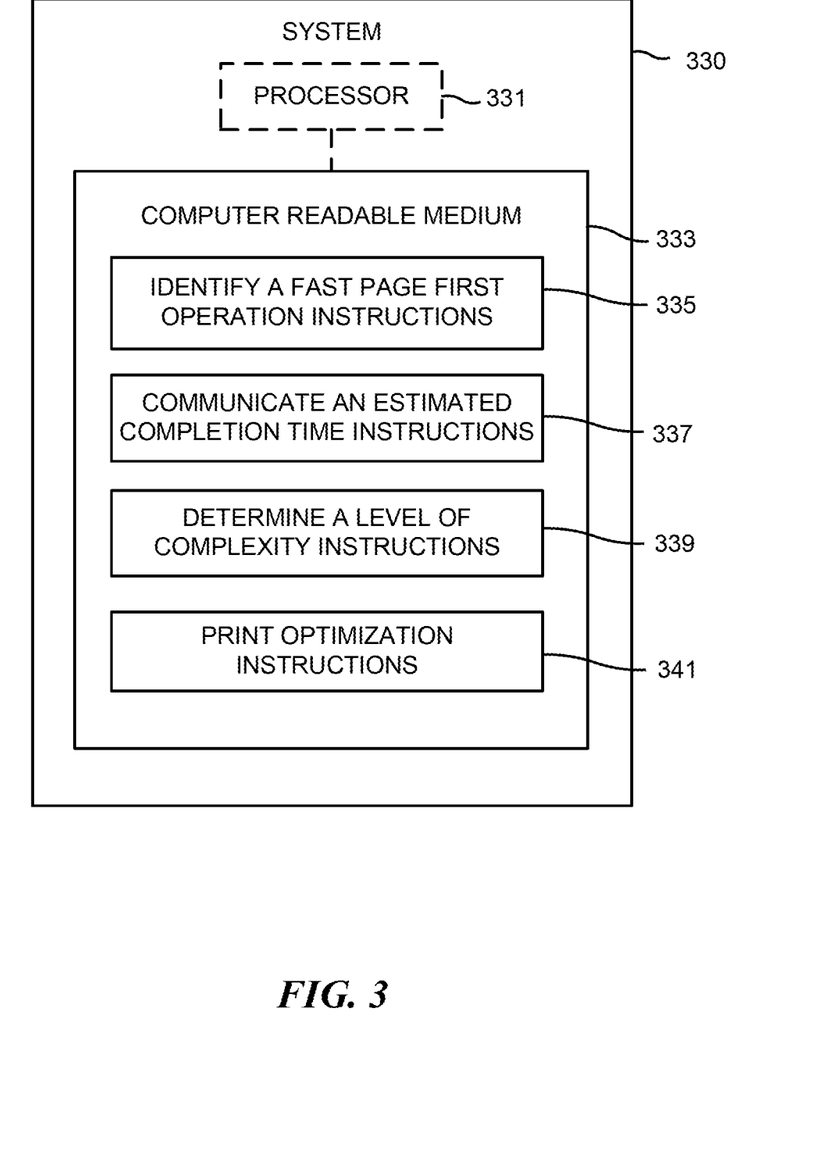
FIG. 3 is a block diagram of an example system for fast page first print optimization, according to the present disclosure.

FIG. 3 is a block diagram of an example system 330 for fast page first print optimization, according to the present disclosure. System 330 may be the same as or different than, system 100 illustrated in FIG. 1. Similarly, system 330 may be the same as printing device 103 illustrated in FIG. 1. System 330 may include at least one computing device that is capable of communicating with at least one remote system. In the example of FIG. 3, system 330 includes a processor 331 and a computer-readable medium 333. Although the following descriptions refer to a single processor and a single computer-readable medium, the descriptions may also apply to a system with multiple processors and computer-readable mediums. In such examples, the instructions may be distributed (e.g., stored) across multiple computer-readable mediums and the instructions may be distributed (e.g., executed by) across multiple processors.

Processor 331 may be one or more central processing units (CPUs), microprocessors, and/or other hardware devices suitable for retrieval and execution of instructions stored in computer-readable medium 333. In the particular example shown in FIG. 3, processor 331 may receive, determine, and send instructions 335, 337, 339, and 341 for fast page first print optimization. As an alternative or in addition to retrieving and executing instructions, processor 331 may include one or more electronic circuits comprising a number of electronic components for performing the functionality of one or more of the instructions in computer-readable medium 333. With respect to the executable instruction representations (e.g., boxes) described and shown herein, it should be understood that part or all of the executable instructions and/or electronic circuits included within one box may, in alternate embodiments, be included in a different box shown in the figures or in a different box not shown.

Computer-readable medium 333 may be any electronic, magnetic, optical, or other physical storage device that stores executable instructions. Thus, computer-readable medium 333 may be, for example, Random Access Memory (RAM), an Electrically-Erasable Programmable Read-Only Memory (EEPROM), a storage drive, an optical disc, and the like. Computer-readable medium 333 may be disposed within system 330, as shown in FIG. 3. In this situation, the executable instructions may be "installed" on the system 330. Additionally and/or alternatively, computer-readable medium 333 may be a portable, external or remote storage medium, for example, that allows system 330 to download the instructions from the portable/external/remote storage medium. In this situation, the executable instructions may be part of an "installation package". As described herein, computer-readable medium 333 may be encoded with executable instructions for fast page first print optimization.

Referring to FIG. 3, identify fast page first operation instructions 335, when executed by a processor (e.g., 331), may cause system 330 to identify instructions within a PDL of a print job, as corresponding with a fast page first operation, as described in relation to FIG. 1. As described herein, the instructions to identify instructions within the PDL as corresponding with the fast page first operation include instructions to identify a fast page first flag within the PDL of the print job. Put another way, if a host driver (e.g., host driver 101 illustrated in FIG. 1) identifies a print job as a fast page first print job, the host driver may include a flag in the print instructions sent to the printing device (e.g., printing device 103 illustrated in FIG. 1). In other examples, the printing device itself may identify a print job as a fast page first print job, and/or all print jobs by default may be handled as fast page first print jobs.

Communicate an estimated completion time instructions 337, when executed by a processor (e.g., 331), may cause system 330 to communicate an estimated completion time of a PDL parser to a print engine. That is, referring to FIGS. 1 and 2, the communicate an estimated completion time instructions 337 may result in issuance of the PEC_Start-Estimate commands, 228 illustrated in FIG. 2.

Determine a level of complexity instructions 339, when executed by a processor (e.g., 331), may cause system 330 to determine a level of complexity for the print job using the PDL for the print job. As described in relation to FIG. 1, the analysis of the complexity of the print job may be done by a host (e.g., host driver 101 illustrated in FIG. 1), and/or by the printing device itself (e.g., printing device 103 illustrated in FIG. 1). Also, as discussed in relation to FIG. 1, the level of complexity may be determined by analyzing language other than the PDL for the print job.

Print optimization instructions 341, when executed by a processor (e.g., 331), may cause system 330 to communicate print optimization instructions to the print engine based on the determined level of complexity and the estimated completion time of the PDL parser. Again, the print optimization instructions 341 may be performed by a host, such as host device 101 illustrated in FIG. 1, and/or the printing device itself, such as printing device 103 illustrated in FIG. 1. In some examples, through analysis of the complexity of the print job, the print optimization instructions 341 may determine the PDL parser of the print device will complete parsing of the print job within a threshold amount of time relative to the estimated completion time. That is, a default value may be used for issuance of the PEC_StartEstimate commands, and based on the level of complexity of the print job, print optimization instructions 341 may determine that the completion of parsing may be earlier than the default value used for the PEC_StartEstimate commands. In such examples, the print optimization instructions 341 may include instructions to direct the print engine to use the estimated completion time for execution of the print job. That is, the print optimization instructions 341 may include instructions to begin the print job (e.g., issue the SV command) based on the earlier parsing completion time, thereby reducing the FPOT of the print job.

In some examples, the processor 331 may execute instructions stored in computer-readable medium 333 to determine that the PDL parser will complete parsing of the print job earlier than the estimated completion time, based on the level of complexity of the print job. In such examples, the print optimization instructions 341 may include instructions to send the earlier completion time of the PDL parser to the print engine.

The processor 331 may execute instructions stored in computer-readable medium 333 to, in response to identifying the print job as corresponding to a fast page first operation, implement a printer driver that defines print parameters for the print job on a first command of each page of the print job, as discussed in relation to FIG. 1. In response to definition of the print parameters for the print command, a page reservation command may be issued to the print engine in response to receipt of the print parameters.

As discussed in relation to FIGS. 1 and 2, the processor 331 may execute instructions stored in computer-readable medium 333 to instruct the print engine to initiate a start-up sequence on an imaging system laser scanner, and initiate a fuser warmup sequence on a fuser temperature heater, in response to communication of the estimated completion time of the PDL parser.

Figure 4:
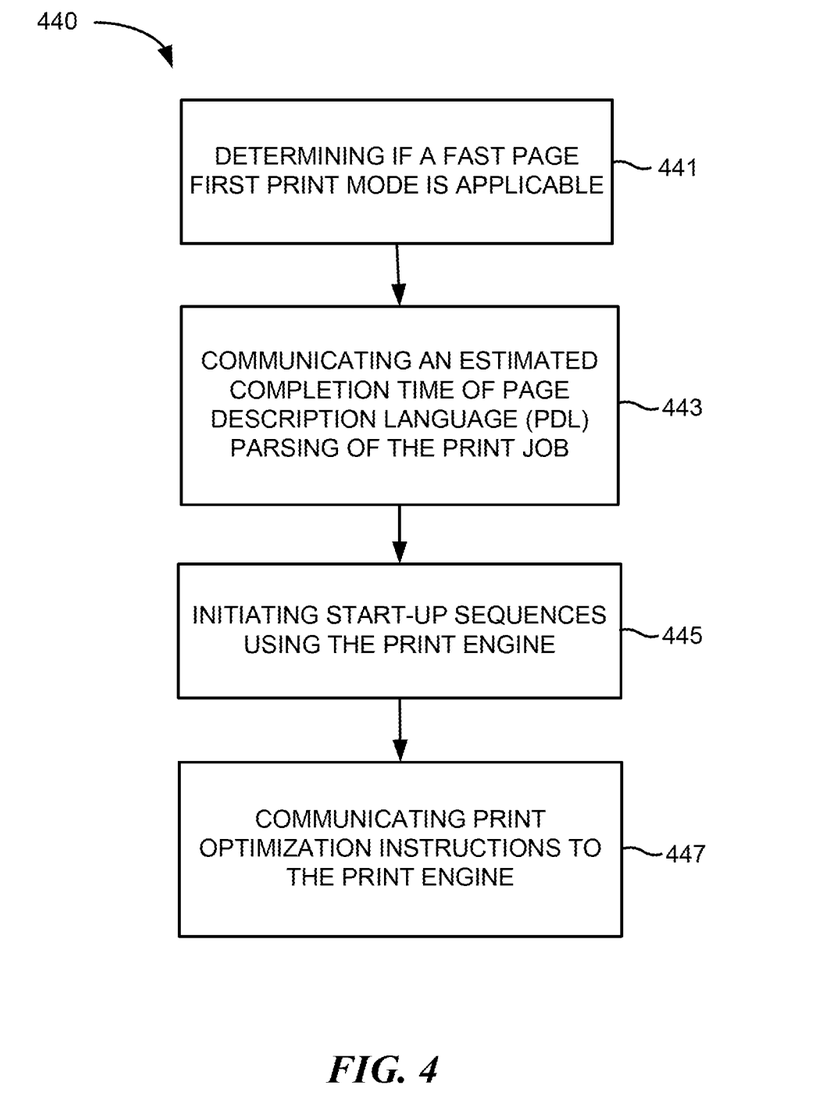
FIG. 4 illustrates an example method for fast page first print optimization, according to the present disclosure.

FIG. 4 illustrates an example method 440 for fast page first print optimization, according to the present disclosure. At 441, the method 440 may include determining if a fast page first print mode is applicable to a print job. Determining if fast page first print mode is applicable to the print job may refer to receiving, from a host driver, the PDL including a fast page first tag. In another example, determining if a fast page first print mod is applicable may refer to determining that a fast page first option has been selected for the print job, among other examples described herein.

At 443, the method 440 may include communicating an estimated completion time of PDL parsing of the print job to a print engine, as described in relation to FIGS. 1, 2, and 3. At 445, the method 440 may include initiating start-up sequences using the print engine, in response to receipt of the estimated completion time, also as described in relation to FIGS. 1, 2, and 3.

At 447, the method 440 may include communicating print optimization instructions to the print engine based on a determined level of complexity of the print job and the estimated completion time of the PDL parsing. As described herein, communicating print optimization may include a host device communicating print optimization instructions to the printing device, and/or the printing device communicating the print optimization instructions to different components within the printing device.

In some examples, the method 440 may include determining that the level of complexity of the print job is below a threshold level of complexity, and communicating the print optimization instructions to the print engine may include communicating an earlier completion time of PDL parsing to the print engine, as described herein. Moreover, the method 440 may include determining that the level of complexity of the print job is above a threshold level of complexity, where communicating the print optimization instructions to the print engine may include instructing the print engine to use the estimated completion time of PDL parsing for execution of the print job, as described herein.

In the foregoing detailed description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense. As used herein, "a number of" an element and/or feature can refer to one or more of such elements and/or features.

What is claimed:

1. A system, comprising:
    a host driver coupled to a printing device, the host driver to:
        send a command to the printing device indicating implementation of a fast page first feature;
        implement a page description language (PDL) on the printing device that defines print parameters for a print job on a first command of each page of the print job; and
        in response to the definition of the print parameters, and during or prior to startup of a print engine on the printing device, determine if a print optimization of the fast page first feature would reduce a first page out time (FPOT) of the print job.

2. The system of claim 1, wherein to determine if the print optimization would reduce the FPOT of the print job includes the host driver to:
    analyze a page description language (PDL) for the print job;
    determine a complexity of the print job based on the PDL; and
    determine an estimated completion time of a PDL parser based on the determined complexity of the print job.

3. The system of claim 1, including the including the host driver to instruct the printing device to:
    issue a page reservation command upon receipt the print parameters; and
    issue a default PDL parsing completion time while the PDL is still processing, to a print engine on the printing device in response to issuance of the page reservation command.

4. The system of claim 1, including the host driver to:
    instruct the printing device to begin a print engine start up process before completion of parsing of the print job, based on an estimated completion time of page description language (PDL) parsing.

5. The system of claim 4, including the host driver to:
    instruct the printing device to communicate an earlier completion time of PDL parsing, in response to a determination that the print optimization of the fast page first feature would reduce the FPOT of the print job.

6. A non-transitory computer readable medium containing instructions executable by a processor to:
    identify instructions within a page description language (PDL) of a print job, as corresponding with a fast page first operation;
    communicate an estimated completion time of a PDL parser to a print engine;
    determine a level of complexity for the print job using the PDL for the print job; and
    communicate print optimization instructions to the print engine based on the determined level of complexity and the estimated completion time of the PDL parser.

7. The non-transitory computer readable medium of claim 6, including instructions executable by the processor to:
    determine that the PDL parser will complete parsing of the print job earlier than the estimated completion time, based on the level of complexity of the print job;
    wherein the instructions to communicate the print optimization instructions to the print engine include instructions to send the earlier completion time of the PDL parser to the print engine.

8. The non-transitory computer readable medium of claim 6, including instructions to:
    in response to identifying the print job as corresponding to a fast page first operation:

implement a printer driver that defines print parameters for the print job on a first command of each page of the print job; and issue a page reservation command to the print engine in response to receipt of the print parameters.

9. The non-transitory computer readable medium of claim 6, wherein the instructions to identify instructions within the PDL as corresponding with the fast page first operation include instructions to:

identify a fast page first flag within the PDL of the print job.

10. The non-transitory computer readable medium of claim 6, wherein the instructions to communicate the print optimization instructions to the print engine include instructions to:

determine the PDL parser will complete parsing of the print job within a threshold amount of time relative to the estimated completion time;

wherein the instructions to communicate print optimization instructions include instructions to direct the print engine to use the estimated completion time for execution of the print job.

11. The non-transitory computer readable medium of claim 6, including instructions executable by the processor to:

instruct the print engine to initiate a start-up sequence on an imaging system, and initiate a fuser warmup sequence on a fuser heater, in response to communication of the estimated completion time of the PDL parser.

12. A method comprising:

determining if a fast page first print mode is applicable to a print job;

communicating an estimated completion time of page description language (PDL) parsing of the print job to a print engine of a printing device;

initiating start-up sequences using the print engine of the printing device, in response to receipt of the estimated completion time;

determining a level of complexity for the print job using the PDL for the print job; and communicating print optimization instructions to the print engine of the printing device based on the determined level of complexity of the print job and the estimated completion time of the PDL parsing.

13. The method of claim 12, including:

determining that the level of complexity of the print job is below a threshold level of complexity;

wherein communicating the print optimization instructions to the print engine of the printing device includes communicating an earlier completion time of PDL parsing to the print engine of the printing device.

14. The method of claim 12, including:

determining that the level of complexity of the print job is above a threshold level of complexity;

wherein communicating the print optimization instructions to the print engine of the printing device includes instructing the print engine of the printing device to use the estimated completion time of PDL parsing for execution of the print job.

15. The method of claim 12, wherein determining if fast print mode is applicable to the print job includes one of:

receiving, from a host driver, the PDL including a fast page first tag; and determining that a fast page first option has been selected for the print job.

* * * * *